No. 680,176. Patented Aug. 6, 1901.
G. ROBERTSON.
GOLD SEPARATOR OR WASHER.
(Application filed Oct. 20, 1900.)
(No Model.) 2 Sheets—Sheet 2.
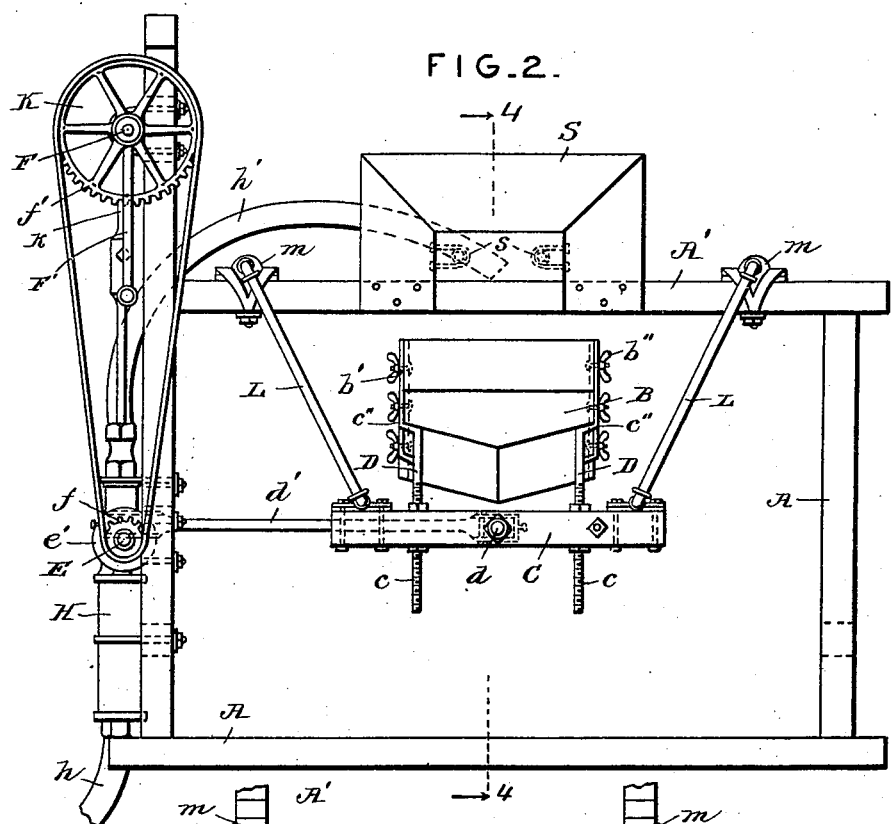
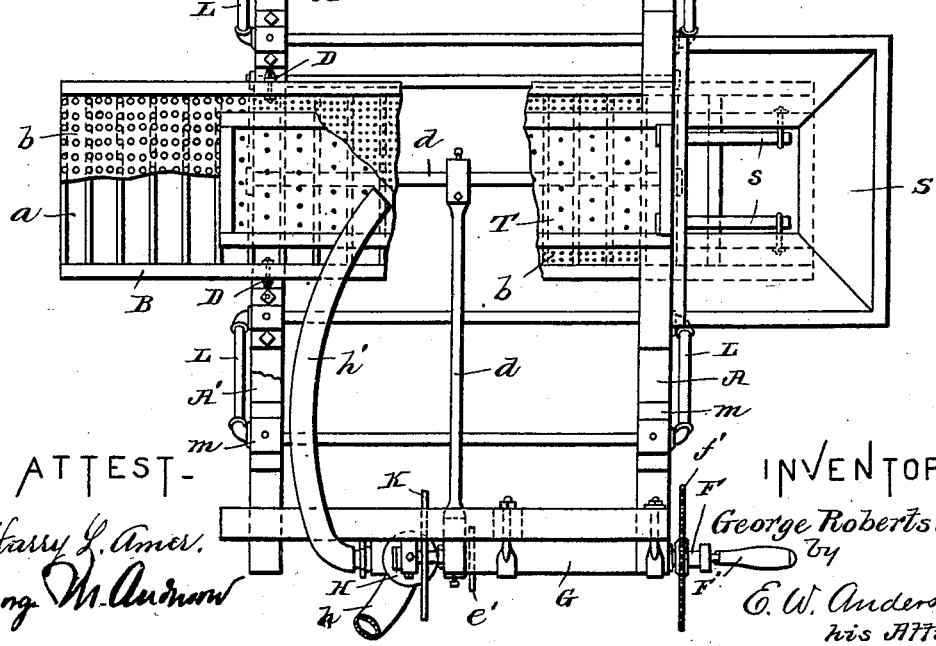
ATTEST-
Harry L. Amer.
Geo. M. Anderson
INVENTOR-
George Robertson
by
E. W. Anderson
his Atty.

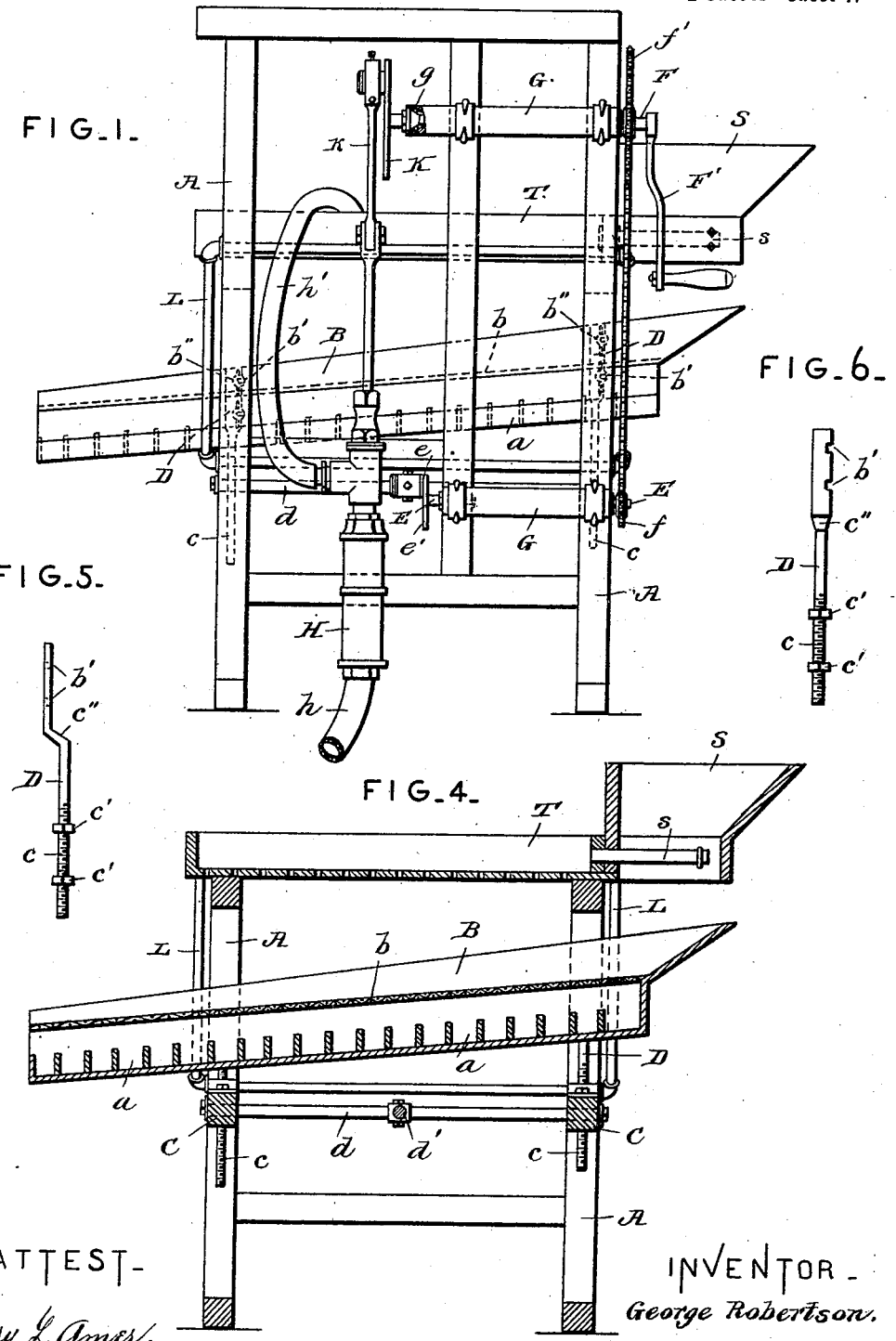

UNITED STATES PATENT OFFICE.

GEORGE ROBERTSON, OF DURANGO, COLORADO.

GOLD SEPARATOR OR WASHER.

SPECIFICATION forming part of Letters Patent No. 680,176, dated August 6, 1901.

Application filed October 20, 1900. Serial No. 33,668. (No model.)

*To all whom it may concern:*

Be it known that I, GEORGE ROBERTSON, a citizen of the United States, residing at Durango, in the county of La Plata and State of Colorado, have invented new and useful Improvements in Gold Separators or Washers, of which the following is a specification.

In the accompanying drawings, illustrating this invention, Figure 1 is a side view of the separator. Fig. 2 is an end view. Fig. 3 is a plan view, partly broken away. Fig. 4 is a sectional view on the line 4 4, Fig. 2; and Figs. 5 and 6 represent details.

The invention has relation to gold separators or washers for placer-work; and it consists in the novel construction and combinations of parts, as hereinafter set forth.

In the annexed drawings the machine is shown having a rectangular framework A, consisting of uprights and cross-beams.

B indicates the inclined pan or riffle-box, usually having an angular or V-form bottom, provided with riffles $a$ and upper screens $b$, a series of which may be used, according to the requirement of the work. The pan is supported from the swinging frame C by means of the arms or standards D, which are vertically adjustable, having screw-stems $c$, which are secured in position on the frame by nuts $c'$. The upper ends of these standards D are angularly made, so as to have shoulders at $c''$ to support the pan. These outwardly-offset upper ends are also provided with slots or notched apertures $b'$ for the fastening screws and nuts $b''$, said notched apertures or slots serving to enable the operator to change the inclination of the pan to a considerable degree, as may be advisable when a dry separating action is desirable.

The swinging frame C is provided with a bar or bearing $d$ for the engagement of the end of the pitman $d'$, which is connected by its other end to a wrist-pin $e$ on the disk $e'$, which is secured to the shaft E, which also carries sprocket-pinions $f$, whereby it is operated by sprocket-chains from the sprocket-wheels $f'$ of the shaft F, which may be turned by the crank F' or in any other suitable manner. The shafts E and F are inclosed in bearings G of tubular form, which are strapped to the framework and are provided with interior ball-bearing, as indicated at $g$, in order to facilitate the running of the driving parts.

H represents the pump, having the supply-hose $h$ and the delivery-hose $h'$, said pump being operated from the upper shaft F by means of the pitman $k$, which is connected to a wrist-pin of the disk K.

L L represent the swing-arms or swing-frames, which connect the swinging frame C to the bar A' of the main frame, said arms being pivoted by the lower ends or bars to said swinging frame and by the upper ends or bars to the adjustable or bracket boxings $m$, which are secured to the bar A'. These boxings can be readily adjusted toward or away from each other in such a manner as to give the pan or riffle-box less or more tilting or settling motion, as it may be desired. Usually the swing-arms are connected in frame form, being made of piping, as indicated.

By means of the nuts in the screw-stems of the supporters D the angle of inclination of the pan or riffle-box, can be changed to alter the gravity action when necessary.

The hopper is indicated at S, said hopper being provided with pipes or tubes $s$, whereby water is conveyed into the hopper from the water tank or box T, into which the hose from the pump discharges. This water-tank is made with small perforations usually to provide a drip for the riffle-box below.

Having described this invention, what I claim, and desire to secure by Letters Patent, is—

In a gold-separator, the horizontal transverse supporting-beam, the upper stationary water-box, having a perforated bottom, the vibratory frame, the laterally-adjustable bearing-boxes upon said beam, the hangers for said frame, having pivotal bearings in said bearing-boxes, and a pivotal connection with said frame, the laterally offset or shouldered screw-threaded standards carried by said frame, the adjusting-nuts for said standards, the riffle-box resting upon the shoulders of said standards, which have open slots at their upper ends, the securing-bolts for said riffle-box engaging said slots of the standards, the hopper on the same level as said water-box, the water-tubes communicating with said water-box, and located at opposite sides of said hopper inside and at the lower portion thereof, and means for transversely vibrating said frame, and riffle-box, substantially as specified.

In testimony whereof I affix my signature in presence of two witnesses.

GEORGE ROBERTSON.

Witnesses:
ARTHUR W. AYRES,
WALTER F. WEIGHTMAN.